(12) United States Patent
Zeng et al.

(10) Patent No.: US 11,075,795 B2
(45) Date of Patent: *Jul. 27, 2021

(54) ARBITRATION METHOD, APPARATUS, AND SYSTEM USED IN ACTIVE-ACTIVE DATA CENTERS

(71) Applicant: Huawei Technologies Co., Ltd., Shenzhen (CN)

(72) Inventors: Jingyong Zeng, Shenzhen (CN); Suhong Huang, Chengdu (CN); Ji Ouyang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,477

(22) Filed: May 8, 2020

(65) Prior Publication Data

US 2020/0274754 A1 Aug. 27, 2020

Related U.S. Application Data

(63) Continuation of application No. 15/655,552, filed on Jul. 20, 2017, now Pat. No. 10,659,292, which is a
(Continued)

(51) Int. Cl.
*H04L 12/24* (2006.01)
*H04L 29/08* (2006.01)
(Continued)

(52) U.S. Cl.
CPC .......... *H04L 41/0695* (2013.01); *H04L 29/08* (2013.01); *H04L 41/00* (2013.01);
(Continued)

(58) Field of Classification Search
USPC ......... 709/223, 233, 214, 27, 224–227, 206; 710/113, 114, 107, 100
See application file for complete search history.

(56) References Cited

U.S. PATENT DOCUMENTS 6,529,995 B1 * 3/2003 Shepherd ............ G06F 11/1435
707/999.202
7,010,607 B1 3/2006 Bunton
(Continued)

FOREIGN PATENT DOCUMENTS

CN 102185717 A 9/2011
CN 103647849 A 3/2014
(Continued)

*Primary Examiner* — Jude Jean Gilles
(74) *Attorney, Agent, or Firm* — Conley Rose, P.C.

(57) ABSTRACT

An arbitration method, apparatus, and system, relates to the field of computer technologies, where the arbitration method, executed by a first data center, includes viewing a preset arbitration policy when determining that communication between the first data center and a second data center is interrupted, and an arbitration device cannot perform arbitration, and continuing providing a service when determining, according to the arbitration policy, that the first data center is a preferred data center, or stopping providing the service when determining, according to the preset arbitration policy, that the first data center is not the preferred data center, where the first data center and the second data center are active-active data centers. Hence, the arbitration method, apparatus, and system solve a problem of a service interruption caused by a fault of the arbitration device, therefore an uninterrupted service is provided for a user.

20 Claims, 7 Drawing Sheets

Related U.S. Application Data continuation of application No. PCT/CN2015/085591, filed on Jul. 30, 2015.

(51) Int. Cl.

| | | |
|---|---|---|
| *H04L 12/26* | (2006.01) | |
| *G06F 11/20* | (2006.01) | |
| *G06F 13/18* | (2006.01) | |
| *G06F 13/16* | (2006.01) | |

(52) U.S. Cl.
CPC ......... *H04L 43/0811* (2013.01); *H04L 43/10* (2013.01); *H04L 67/1051* (2013.01); *H04L 67/1095* (2013.01)

(56) References Cited

U.S. PATENT DOCUMENTS

| | | | |
|---|---|---|---|
| 7,925,917 B1* | 4/2011 | Roy | G06F 11/2094 714/4.11 |
| 8,149,725 B2* | 4/2012 | Lipps | H04L 41/0695 370/252 |
| 8,578,204 B1 | 11/2013 | Ortenberg et al. | |
| 8,650,299 B1* | 2/2014 | Huang | G06F 9/5077 709/226 |
| 8,745,125 B2 | 6/2014 | McDysan et al. | |
| 8,843,681 B2* | 9/2014 | Lin | G06F 13/1605 710/113 |
| 2006/0193252 A1 | 8/2006 | Naseh et al. | |
| 2006/0206621 A1 | 9/2006 | Toebes et al. | |
| 2007/0226439 A1* | 9/2007 | Hasegawa | G06F 11/1451 711/162 |
| 2007/0266198 A1 | 11/2007 | Bousis | |
| 2009/0233705 A1* | 9/2009 | LeMay | G07F 17/3223 463/25 |
| 2010/0105454 A1* | 4/2010 | Weber | G06Q 50/34 463/1 |
| 2010/0142472 A1 | 6/2010 | Tarleton et al. | |
| 2012/0078494 A1 | 3/2012 | Judd et al. | |
| 2012/0136515 A1 | 5/2012 | Noffsinger et al. | |
| 2013/0297787 A1* | 11/2013 | Shah | H04L 43/10 709/224 |
| 2014/0188812 A1* | 7/2014 | Vijayan | G06F 11/1469 707/679 |
| 2015/0116447 A1* | 4/2015 | Kobayashi | H04W 76/10 348/14.02 |
| 2016/0188689 A1* | 6/2016 | Singh | H04L 67/1095 707/610 |
| 2016/0285976 A1* | 9/2016 | Chan | H04L 67/02 |
| 2016/0292053 A1* | 10/2016 | Antony | G06F 11/2038 |
| 2017/0300347 A1 | 10/2017 | Tian et al. | |
| 2017/0317875 A1 | 11/2017 | Zeng et al. | |

FOREIGN PATENT DOCUMENTS

| | | |
|---|---|---|
| CN | 103812929 A | 5/2014 |
| CN | 104469699 A | 3/2015 |
| CN | 104717077 A | 6/2015 |
| EP | 3214865 A1 | 9/2017 |

\* cited by examiner

ARBITRATION METHOD, APPARATUS, AND SYSTEM USED IN ACTIVE-ACTIVE DATA CENTERS

CROSS-REFERENCE TO RELATED APPLICATION

This application is a continuation of U.S. patent application Ser. No. 15/655,552, filed on Jul. 20, 2017, which is a continuation of International Patent Application No. PCT/CN2015/085591, filed on Jul. 30, 2015. Both of the aforementioned applications are hereby incorporated by reference in their entireties.

TECHNICAL FIELD

The present disclosure relates to the field of computer technologies, and in particular, to an arbitration method, apparatus and system that are used in active-active data centers.

BACKGROUND

For a purpose of disaster recovery, generally, at least two data centers are established, where one data center bears user services, and the other data center backs up data, a configuration, a service, and the like. Active-active data centers refer to that two data centers bear a service at the same time and perform mutual backup such that an overall service capability and system resource utilization of the two data centers are improved.

The two data centers of the active-active data centers send a heartbeat packet to each other every set time, and if the heartbeat packet is not received from each other within the set time, the backup is interrupted. In this case, if both data centers continue bearing the service, a data inconsistency problem may occur. An arbitration mechanism is currently one of means used to avoid occurrence of the data inconsistency problem, and an implementation manner is as follows. The two data centers separately send an arbitration request to an arbitration device that is disposed to be independent from the two data centers. The arbitration device determines a victorious data center according to the arbitration request, and the victorious data center continues providing the service (namely bearing the service) while a losing data center stops providing the service.

When the arbitration device encounters a fault, the arbitration mechanism fails. In this case, if the two data centers do not receive the heartbeat packet from each other within the set time, a data center that continues providing the service cannot be determined. In order to avoid the occurrence of the data inconsistency problem, the two data centers stop the service at the same time, which causes a service interruption.

SUMMARY

In order to resolve a problem of a service interruption caused by a fault of an arbitration device, embodiments of the present disclosure provide an arbitration method, apparatus and system that are used in active-active data centers. The technical solutions are as follows.

According to a first aspect, an embodiment of the present disclosure provides an arbitration method used in active-active data centers, where the arbitration method includes viewing, by the first data center, a preset arbitration policy when a first data center determines that communication between the first data center and a second data center is interrupted, and an arbitration device cannot perform arbitration, and continuing providing, by the first data center, a service when the first data center determines, according to the arbitration policy, that the first data center is a preferred data center, or stopping providing, by the first data center, a service when the first data center determines, according to the arbitration policy, that the first data center is not a preferred data center, where the first data center and the second data center are the active-active data centers.

In a possible implementation manner of the first aspect, the arbitration method further includes determining, by the first data center, whether the first data center is in a set abnormal state, and sending, by the first data center, a notification message to the second data center when the first data center is in the set abnormal state, and the communication between the first data center and the second data center is not interrupted, where the notification message instructs the second data center to replace the first data center to provide the service.

In another possible implementation manner of the first aspect, the arbitration device is a disaster recovery device, where the disaster recovery device is configured to back up data of the first data center and that of the second data center.

Optionally, the arbitration method further includes sending, by the first data center using a data backup link, an arbitration request to the arbitration device when the first data center determines that the communication between the first data center and the second data center is interrupted, and the arbitration device can perform arbitration, where the data backup link is configured to transmit backup data sent to the arbitration device by the first data center.

Preferably, sending, by the first data center using the data backup link, an arbitration request to the arbitration device includes sending, by the first data center, the arbitration request to the arbitration device first when the first data center needs to send both the arbitration request and the data of the first data center to the arbitration device, or sending, by the first data center using an arbitration logic link, the arbitration request to the arbitration device, where the data backup link is classified into the arbitration logic link and a data logic link, and the data logic link is configured to transmit the backup data sent to the arbitration device by the first data center.

In still another possible implementation manner of the first aspect, the arbitration method further includes monitoring, by the first data center in real time, whether communication between the first data center and the arbitration device, and that between the second data center and the arbitration device are interrupted, setting, by the first data center, an arbitration device flag bit according to a monitoring result, where the arbitration device flag bit indicates whether the arbitration device can perform arbitration, and determining, by the first data center according to the arbitration device flag bit, whether the arbitration device can perform arbitration.

Optionally, setting, by the first data center, an arbitration device flag bit according to a monitoring result includes setting, by the first data center, the arbitration device flag bit to that the arbitration device can perform arbitration when the first data center determines that the communication between the first data center and the arbitration device is not interrupted, or when the first data center determines that the communication between the second data center and the arbitration device is not interrupted, setting, by the first data center, the arbitration device flag bit to that the arbitration device can perform arbitration when the first data center determines that the communication between the first data center and the arbitration device is interrupted, and determines that the communication between the first data center and the second data center is interrupted, and setting, by the first data center, the arbitration device flag bit to that the arbitration device cannot perform arbitration when the first data center determines that the communication between the first data center and the arbitration device is interrupted, and determines that the communication between the second data center and the arbitration device is interrupted.

In yet another possible implementation manner of the first aspect, the arbitration method further includes viewing, by the first data center, the arbitration policy when the first data center determines that the communication between the first data center and the second data center is interrupted, and the arbitration device can perform arbitration, immediately sending, by the first data center, an arbitration request to the arbitration device when the first data center determines, according to the arbitration policy, that the first data center is the preferred data center, and sending, by the first data center, the arbitration request to the arbitration device after a set time is delayed when the first data center determines, according to the arbitration policy, that the first data center is not the preferred data center.

In still yet another possible implementation manner of the first aspect, the arbitration device is a cloud server.

According to a second aspect, an embodiment of the present disclosure provides an arbitration apparatus used in active-active data centers, where the arbitration apparatus includes a first viewing module configured to view a preset arbitration policy when communication between a first data center and a second data center is interrupted, and an arbitration device cannot perform arbitration, and a first service module configured to continue providing a service when it is determined, according to the arbitration policy, that the first data center is a preferred data center, or stop providing a service when it is determined, according to the arbitration policy, that the first data center is not a preferred data center, where the first data center and the second data center are the active-active data centers.

In a possible implementation manner of the first aspect, the arbitration apparatus further includes a state determining module configured to determine whether the first data center is in a set abnormal state, and a message sending module configured to send a notification message to the second data center when the first data center is in the set abnormal state, and the communication between the first data center and the second data center is not interrupted, where the notification message instructs the second data center to replace the first data center to provide the service.

In another possible implementation manner of the second aspect, the arbitration device is a disaster recovery device, where the disaster recovery device is configured to back up data of the first data center and that of the second data center.

Optionally, the arbitration apparatus further includes a request sending module configured to send, using a data backup link, an arbitration request to the arbitration device when the communication between the first data center and the second data center is interrupted, and the arbitration device can perform arbitration, where the data backup link is configured to transmit backup data sent to the arbitration device by the first data center.

Preferably, the request sending module is configured to send the arbitration request to the arbitration device first when the first data center needs to send both the arbitration request and the data of the first data center to the arbitration device, or send, using an arbitration logic link, the arbitration request to the arbitration device, where the data backup link is classified into the arbitration logic link and a data logic link, and the data logic link is configured to transmit the backup data sent to the arbitration device by the first data center.

In still another possible implementation manner of the second aspect, the arbitration apparatus further includes a monitoring module configured to monitor in real time whether communication between the first data center and the arbitration device, and that between the second data center and the arbitration device are interrupted, a setting module configured to set an arbitration device flag bit according to a monitoring result, where the arbitration device flag bit indicates whether the arbitration device can perform arbitration, and an arbitration device determining module configured to determine, by the first data center according to the arbitration device flag bit, whether the arbitration device can perform arbitration.

Optionally, the setting module is configured to set the arbitration device flag bit to that the arbitration device can perform arbitration when the communication between the first data center and the arbitration device is not interrupted, or when the communication between the second data center and the arbitration device is not interrupted, set the arbitration device flag bit to that the arbitration device can perform arbitration when the communication between the first data center and the arbitration device is interrupted, and the communication between the first data center and the second data center is interrupted, and set the arbitration device flag bit to that the arbitration device cannot perform arbitration when the communication between the first data center and the arbitration device is interrupted, and the communication between the second data center and the arbitration device is interrupted.

In yet another possible implementation manner of the second aspect, the arbitration apparatus further includes a second viewing module configured to view the arbitration policy when the communication between the first data center and the second data center is interrupted, and the arbitration device can perform arbitration, and a second service module configured to immediately send an arbitration request to the arbitration device when it is determined, according to the arbitration policy, that the first data center is the preferred data center, and send the arbitration request to the arbitration device after a set time is delayed when it is determined, according to the arbitration policy, that the first data center is not the preferred data center.

In still yet another possible implementation manner of the second aspect, the arbitration device is a cloud server.

According to a third aspect, an embodiment of the present disclosure provides an arbitration system used in active-active data centers, where the arbitration system includes a first data center configured to view a preset arbitration policy when determining that communication between the first data center and a second data center is interrupted, and an arbitration device cannot perform arbitration, and continue providing a service when determining, according to the arbitration policy, that the first data center is a preferred data center, or stop providing a service when determining, according to the arbitration policy, that the first data center is not a preferred data center, and the second data center configured to view the preset arbitration policy when the communication between the second data center and the first data center is interrupted, and the arbitration device cannot perform arbitration, and continue providing the service when determining, according to the arbitration policy, that the second data center is a preferred data center, or stop providing the service when determining, according to the arbitration policy, that the second data center is not the preferred data center, where the first data center and the second data center are the active-active data centers.

Beneficial effects of the technical solutions provided in the embodiments of the present disclosure are as follows.

A first data center views a preset arbitration policy when the first data center determines that communication between the first data center and a second data center is interrupted, and an arbitration device cannot perform arbitration, and continues providing a service when determining, according to the arbitration policy, that the first data center is a preferred data center, or stops providing a service when determining, according to the arbitration policy, that the first data center is not a preferred data center. In this way, when the first data center determines that the communication between the first data center and the second data center is interrupted, and the arbitration device cannot perform arbitration, only the preferred data center continues providing the service, which resolves a problem of a service interruption caused by a fault of the arbitration device, and ensures that an uninterrupted service is provided for a user.

BRIEF DESCRIPTION OF DRAWINGS

In order to describe technical solutions in embodiments of the present disclosure more clearly, the following briefly introduces accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

In order to make the objectives, technical solutions, and advantages of the present disclosure clearer, the following further describes embodiments of the present disclosure in detail with reference to the accompanying drawings.

Figure 1:
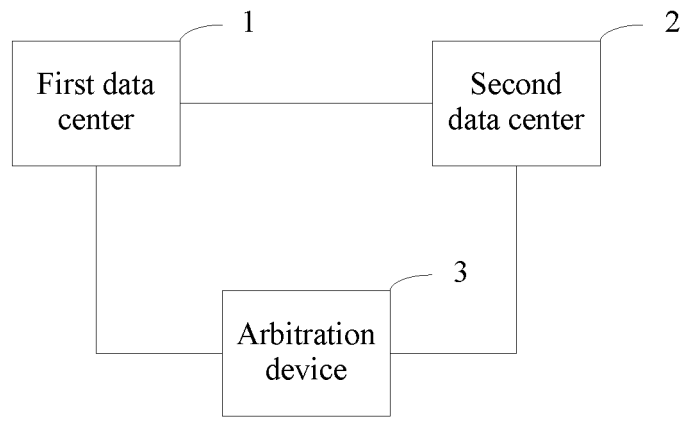
FIG. 1 is a diagram of an application scenario of an arbitration method used in active-active data centers according to Embodiment 1 of the present disclosure.

The following briefly describes, with reference to FIG. 1, an application scenario of an arbitration method used in active-active data centers provided in an embodiment of the present disclosure.

A first data center 1 and a second data center 2 are disposed in the application scenario shown in FIG. 1, where the first data center 1 and the second data center 2 are the active-active data centers, that is, the first data center 1 and the second data center 2 provide a service at the same time and perform mutual backup. As shown in FIG. 1, the first data center 1 is connected to the second data center 2. Further, the first data center 1 may be connected to the second data center 2 through an optical fiber or a network cable. The first data center 1 and the second data center 2 back up data using the optical fiber or the network cable, and send, using the optical fiber or the network cable, a heartbeat packet to each other every set time (for example, 1 second (s)) in order to determine whether the connection between the first data center and the second data center is interrupted.

In actual application, data backup between the first data center 1 and the second data center 2 may be synchronous replication. In order to implement the synchronous replication, in one aspect, backup data may be transmitted using a link that has a fast transmission speed, for example, the optical fiber. In another aspect, a distance between the first data center 1 and the second data center 2 may be limited to a set distance (for example, 100 kilometers (km)), for example, the first data center 1 and the second data center 2 are disposed in a same city.

Further, the first data center 1 and the second data center 2 may both include a storage layer, an application layer, and a network layer. Part of nodes of one or more clusters (for example, Oracle Real Application Clusters on the application layer) are respectively set on a same layer (the storage layer, the application layer, or the network layer) of the first data center 1 and the second data center 2. The arbitration method provided in this embodiment of the present disclosure may be applicable to arbitration on a same layer of the first data center 1 and the second data center 2, or may be applicable to arbitration on a same cluster of the first data center 1 and the second data center 2.

Optionally, an arbitration device 3 may further be disposed in the application scenario shown in FIG. 1, where the arbitration device 3 is disposed to be independent from the first data center 1 and the second data center 2, and the arbitration device 3 is separately connected to the first data center 1 and the second data center 2. Further, the arbitration device 3 may be a device especially set for implementing an arbitration mechanism described in the background part.

It should be noted that, the application scenario shown in FIG. 1 is merely exemplary, and the present disclosure is not limited thereto.

Embodiment 1

Figure 2:
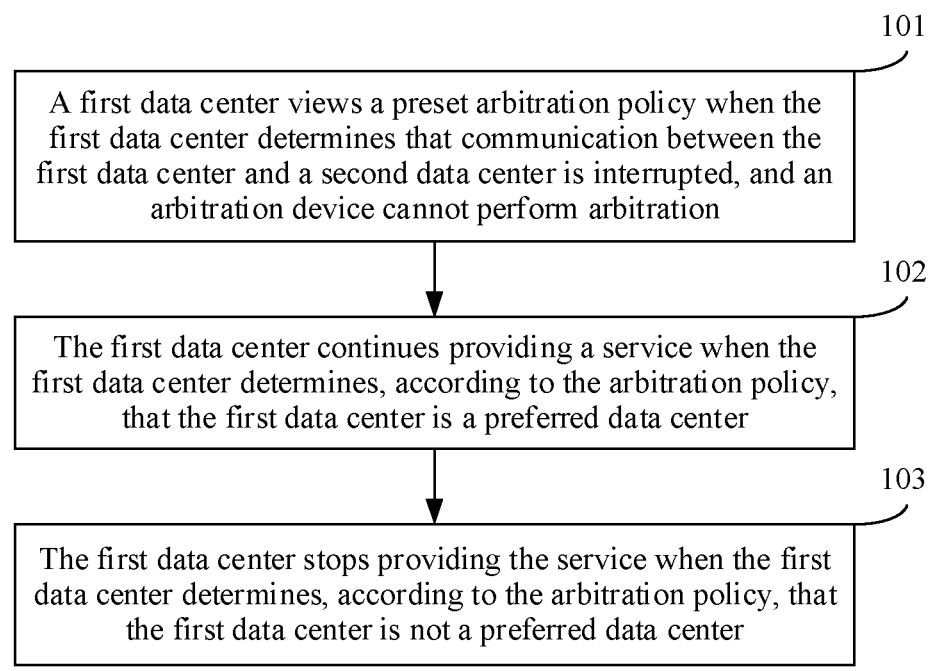
FIG. 2 is a flowchart of an arbitration method used in active-active data centers according to Embodiment 1 of the present disclosure.

This embodiment of the present disclosure provides an arbitration method used in active-active data centers. Referring to FIG. 2, the arbitration method includes the following steps.

Step 101: A first data center views a preset arbitration policy when the first data center determines that communication between the first data center and a second data center is interrupted, and an arbitration device cannot perform arbitration.

In this embodiment, the first data center and the second data center are the active-active data centers.

In actual application, whether the communication between the first data center and the second data center is interrupted may be determined according to a heartbeat packet mutually sent between the first data center and the second data center every a set time (for example, 1 s). The first data center determines that the communication between the first data center and the second data center is not interrupted if the first data center receives a heartbeat packet from the second data center within a set threshold time (for example, 1 s or 5 s), or the first data center determines that the communication between the first data center and the second data center is interrupted if the first data center does not receive a heartbeat packet from the second data center within the set threshold time. Likewise, the second data center determines that the communication between the first data center and the second data center is not interrupted if the second data center receives a heartbeat packet from the first data center within the set threshold time, or the second data center determines that the communication between the first data center and the second data center is interrupted if the second data center does not receive a heartbeat packet from the first data center within the set threshold time.

Optionally, the method may further include monitoring, by the first data center, whether the communication between the first data center and the second data center is interrupted.

Step 102: The first data center continues providing a service when the first data center determines, according to the arbitration policy, that the first data center is a preferred data center.

Step 103: The first data center stops providing the service when the first data center determines, according to the arbitration policy, that the first data center is not the preferred data center.

It should be noted that, that an execution body is the first data center is used as an example for description in this embodiment. In specific implementation, being the same as the first data center, the second data center may execute the following steps. The second data center views the preset arbitration policy when the second data center determines that the communication between the second data center and the first data center is interrupted, and the arbitration device cannot perform arbitration, and the second data center continues providing the service when the second data center determines, according to the arbitration policy, that the second data center is a preferred data center, or the second data center stops providing the service when the second data center determines, according to the arbitration policy, that the second data center is not the preferred data center.

In actual application, a user may select, in active-active data centers, one data center as a preferred data center, and set, in each data center according to a selection result, a flag bit used to indicate whether a data center is the preferred data center. For example, 1 indicates that the data center is the preferred data center, and 0 indicates that the data center is not the preferred data center. When the communication between the first data center and the second data center is interrupted, and the arbitration device cannot perform arbitration, both the first data center and the second data center determine, using a respective flag bit, whether the first data center itself or the second data center itself is the preferred data center. A data center that is the preferred data center continues providing the service, and a data center that is not the preferred data center stops providing the service in order to avoid a problem of data inconsistency caused when the two data centers whose backup is interrupted provide the service at the same time.

According to this embodiment of the present disclosure, when a first data center determines that communication between the first data center and a second data center is interrupted, and an arbitration device cannot perform arbitration, the first data center views a preset arbitration policy, and continues providing a service when determining, according to the arbitration policy, that the first data center is a preferred data center, or stops providing a service when determining, according to the arbitration policy, that the first data center is not a preferred data center. In this way, when the first data center determines that the communication between the first data center and the second data center is interrupted, and the arbitration device cannot perform arbitration, only the preferred data center continues providing the service, which resolves a problem of a service interruption caused by a fault of the arbitration device, and ensures that an uninterrupted service is provided for a user.

Embodiment 2

Figure 3:
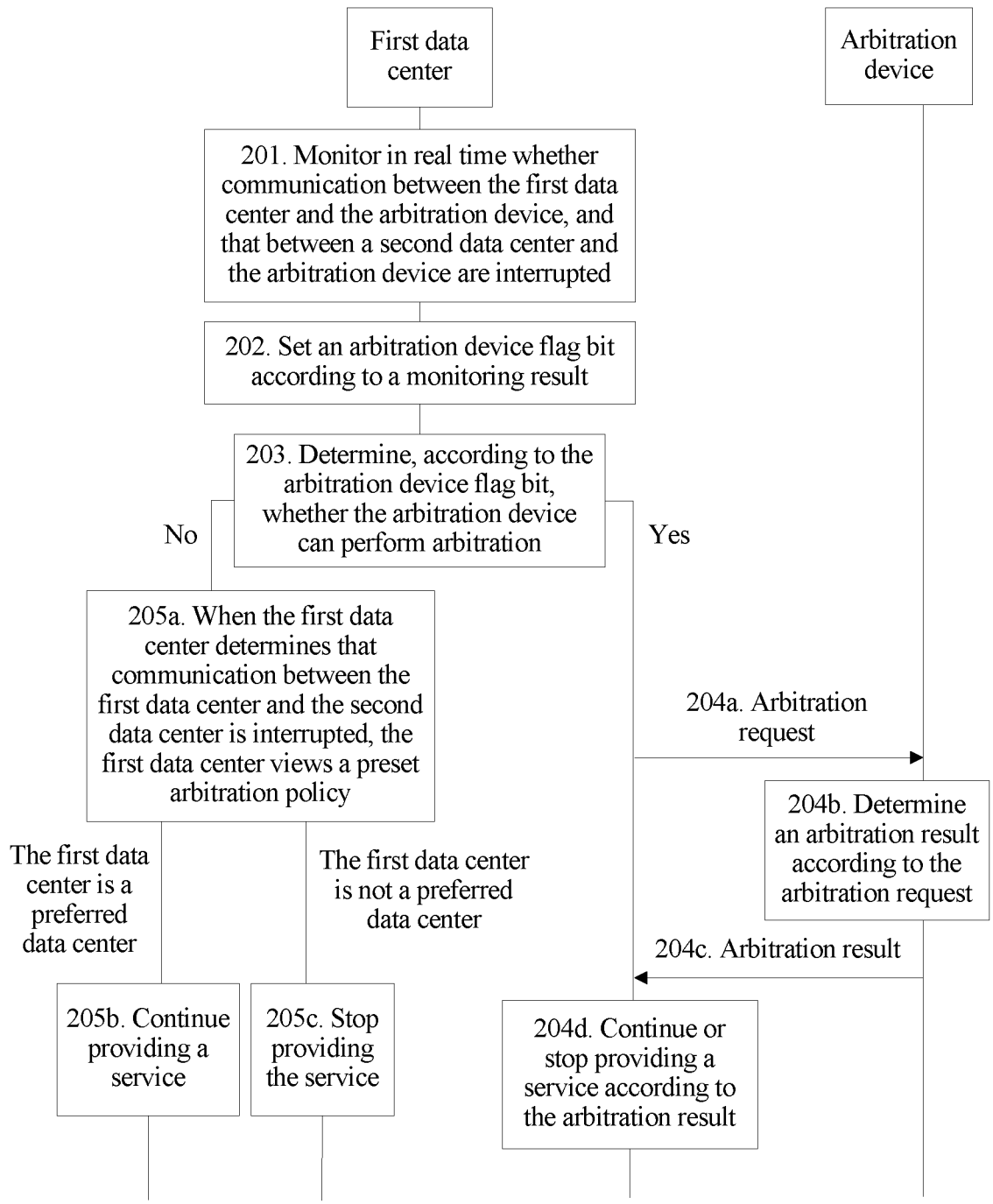
FIG. 3 is a diagram of information interaction in an arbitration method used in active-active data centers according to Embodiment 2 of the present disclosure.

This embodiment of the present disclosure provides an arbitration method used in active-active data centers, and this embodiment further describes in detail the arbitration method used in the active-active data centers provided in Embodiment 1. Referring to FIG. 3, the arbitration method includes the following steps.

Step 201: A first data center monitors in real time whether communication between the first data center and an arbitration device, and that between a second data center and the arbitration device are interrupted.

In this embodiment, the first data center and the second data center are the active-active data centers, and the arbitration device is disposed to be independent from the first data center and the second data center.

In actual application, whether communication between the first data center and the second data center is interrupted may be determined according to a heartbeat packet mutually sent between the first data center and the second data center every a set time (for example, 1 s). The first data center determines that the communication between the first data center and the second data center is not interrupted if the first data center receives a heartbeat packet sent by the second data center within a set threshold time (for example, 1 s or 5 s), or the first data center determines that the communication between the first data center and the second data center is interrupted if the first data center does not receive a heartbeat packet from the second data center within the set threshold time. Likewise, if the second data center receives a heartbeat packet sent by the first data center within the set threshold time, the second data center determines that the communication between the first data center and the second data center is not interrupted, or the second data center determines that the communication between the first data center and the second data center is interrupted if the second data center does not receive a heartbeat packet from the first data center within the set threshold time.

In specific implementation, when the first data center determines that the communication between the first data center and the second data center is not interrupted, the first data center may query the second data center about whether the communication between the second data center and the arbitration device is interrupted to determine whether the communication between the second data center and the arbitration device is interrupted.

Whether the communication between the first data center and the arbitration device and that between the second data center and the arbitration device are interrupted may be determined according to a heartbeat packet mutually sent between the first data center and the arbitration device and between the second data center and the arbitration device every a set time (for example, 1 s). The first data center (or the second data center) determines that the communication between the first data center (or the second data center) and the arbitration device is not interrupted if the first data center (or the second data center) receives a heartbeat packet from the arbitration device within the set threshold time (for example, 1 s or 5 s), or The first data center (or the second data center) determines that the communication between the first data center (or the second data center) and the arbitration device is interrupted if the first data center (or the second data center) does not receive a heartbeat packet from the arbitration device within the set threshold time.

Step 202: The first data center sets an arbitration device flag bit according to a monitoring result.

In this embodiment, the arbitration device flag bit indicates whether the arbitration device can perform arbitration.

Figure 4:
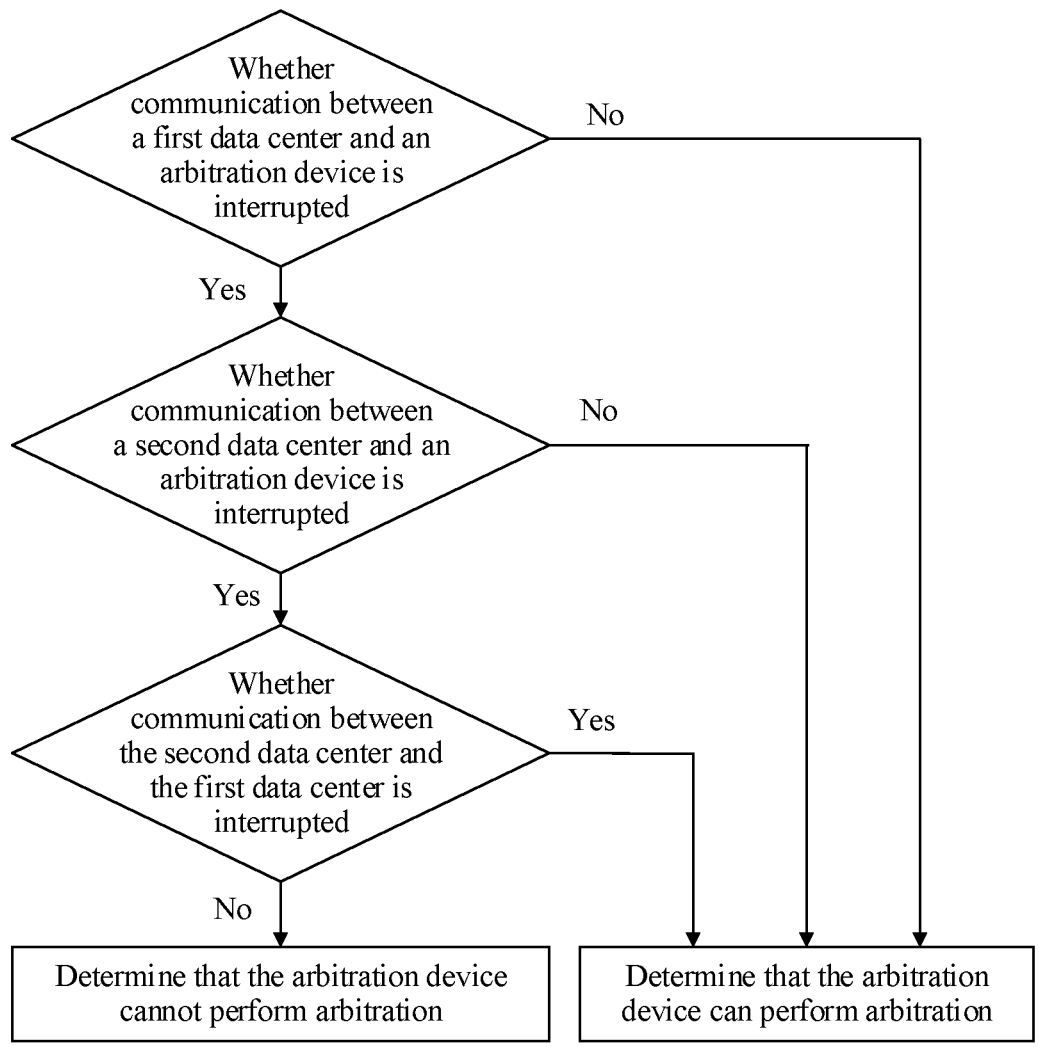
FIG. 4 is a flowchart of determining whether an arbitration device can perform arbitration according to Embodiment 2 of the present disclosure.

In this embodiment, referring to FIG. 4, step 202 may include setting, by the first data center, the arbitration device flag bit to that the arbitration device can perform arbitration when the first data center determines that the communication between the first data center and the arbitration device is not interrupted, or when the first data center determines that the communication between the second data center and the arbitration device is not interrupted, setting, by the first data center, the arbitration device flag bit to that the arbitration device can perform arbitration when the first data center determines that the communication between the first data center and the arbitration device is interrupted, and determines that the communication between the first data center and the second data center is interrupted, and setting, by the first data center, the arbitration device flag bit to that the arbitration device cannot perform arbitration when the first data center determines that the communication between the first data center and the arbitration device is interrupted, and determines that the communication between the second data center and the arbitration device is interrupted.

It may be understood that, when the first data center determines that the communication between the first data center and the arbitration device is not interrupted, or when the first data center determines that the communication between the second data center and the arbitration device is not interrupted, the first data center sets the arbitration device flag bit to that the arbitration device can perform arbitration, that is, when one data center (the first data center or the second data center) can use the arbitration device, it is determined that the arbitration device can perform arbitration such that the arbitration device is fully used to perform arbitration in order to avoid having a risk that, when the arbitration is performed according to a preferred data center (for details, refer to step 205a to step 205c), the preferred data center is a party that encounters a fault.

When the first data center determines that the communication between the first data center and the arbitration device is interrupted, and determines that the communication between the first data center and the second data center is interrupted, the first data center sets the arbitration device flag bit to that the arbitration device can perform arbitration, that is, when it cannot be determined that the communication between the second data center and the arbitration device is interrupted, the arbitration device is used to perform arbitration by default in order to avoid occurrence of a data inconsistency situation caused when the second data center continues providing a service when the communication between the second data center and the arbitration device is not interrupted, and at the same time, the first data center happens to be the preferred data center and also continues providing the service.

Step 203: The first data center determines, according to the arbitration device flag bit, whether the arbitration device can perform arbitration.

When the arbitration device can perform arbitration, step 204a to step 204d are performed, when the arbitration device cannot perform arbitration, step 205a to step 205c are performed.

For example, when the arbitration device flag bit is 1, it indicates that the arbitration device can perform arbitration, and when the arbitration device flag bit is 0, it indicates that the arbitration device cannot perform arbitration.

Step 204a: The first data center sends an arbitration request to the arbitration device when the first data center determines that communication between the first data center and the second data center is interrupted.

In this embodiment, step 204a may include viewing, by the first data center, a preset arbitration policy, and immediately sending, by the first data center, the arbitration request to the arbitration device when the first data center determines, according to the arbitration policy, that the first data center is a preferred data center, or sending, by the first data center, the arbitration request to the arbitration device after a set time is delayed when the first data center determines, according to the arbitration policy, that the first data center is not a preferred data center.

In actual application, when the communication between the first data center and the second data center is interrupted, a user may expect that some data center can preferably survive (a data center that continues providing a service). Therefore, the user may select, from the active-active data centers, a data center as the preferred data center, and set, in each data center according to a selection result, a flag bit used to indicate whether a data center is the preferred data center. For example, 1 indicates that the data center is the preferred data center, and 0 indicates that the data center is not the preferred data center. When the communication between the first data center and the second data center is interrupted, both the first data center and the second data center determine, using a respective flag bit, whether the first data center or the second data center is the preferred data center. A data center that is the preferred data center immediately sends the arbitration request to the arbitration device, and a data center that is not the preferred data center sends the arbitration request to the arbitration device after the set time is delayed, thereby improving a survival probability of the data center that is the preferred data center.

Step 204b: The arbitration device determines an arbitration result according to the arbitration request.

In specific implementation, the arbitration device may determine the arbitration result according to a time sequence of receiving the arbitration request, that is, the arbitration device determines that a sending party whose arbitration request is first received is a victorious party (a data center that continues providing a service). Further, the arbitration device sets a flag bit, where 1 indicates that the arbitration request is received (namely, the victorious party has been determined), and 0 indicates that the arbitration request is not received. When a data center sends the arbitration request to the arbitration device, the arbitration device views the flag bit. When the flag bit is 0, the arbitration device replies to the data center that the data center is the victorious party, and changes the flag bit to 1, and if the flag bit is 1, the arbitration device replies that the data center is not the victorious party.

The arbitration device may also determine the arbitration result according to a quantity of services bore by each data center, that is, the arbitration device determines that a data center that bears the most services is the victorious party in order to save transition time required by the victorious party for bearing all the services.

The arbitration device may further determine the arbitration result according to another criterion, which is not limited by the present disclosure.

Step 204c: The arbitration device sends the arbitration result to the first data center.

Step 204d: The first data center continues or stops providing a service according to the arbitration result.

Further, step 204d may include continuing providing the service by the first data center when the arbitration result includes that the first data center is the victorious party, or stopping providing the service by the first data center when the arbitration result includes that the first data center is not the victorious party.

It should be noted that, when steps 204a to 204d are performed, the first data center suspends the service in order to ensure that data of the first data center is consistent with that of the second data center.

Steps 201 to 204d are optional. For arbitration performed according to a preferred data center (for details, refer to step 205a to step 205c), a victorious party (a data center that continues providing the service) is specified in advance. Therefore, there is a risk that the victorious party is a data center that encounters a fault. In addition, because the data center that encounters a fault cannot send the arbitration request to the arbitration device, the arbitration performed by the arbitration device does not have the risk that the victorious party is the data center that encounters a fault. When step 201 to step 204d are performed, the arbitration device is preferably used to perform arbitration, and only when the arbitration device cannot perform arbitration, the arbitration is performed according to the preferred data center. In one aspect, the risk that the victorious party is the data center that encounters a fault can be avoided as much as possible. In another aspect, it is ensured that the victorious party can be determined when the arbitration device cannot perform arbitration in order to ensure that the service is uninterrupted. When step 201 to step 204d are not performed, it may be avoided especially setting the arbitration device that implements an arbitration mechanism, which reduces an implementation cost.

Step 205a: When the first data center determines that communication between the first data center and the second data center is interrupted, the first data center views a preset arbitration policy. When the first data center determines, according to the arbitration policy, that the first data center is a preferred data center, step 205b is performed, or when the first data center determines, according to the arbitration policy, that the first data center is not the preferred data center, step 205c is performed.

Step 205b: The first data center continues providing a service.

Step 205c: The first data center stops providing the service.

As described above, a user may select, from the active-active data centers, a data center as the preferred data center, and set, in each data center according to a selection result, a flag bit used to indicate whether a data center is the preferred data center. For example, 1 indicates that the data center is the preferred data center, and 0 indicates that the data center is not the preferred data center. When the communication between the first data center and the second data center is interrupted, and the arbitration device cannot perform arbitration, both the first data center and the second data center determine, using a respective flag bit, whether the first data center itself or the second data center itself is the preferred data center. A data center that is the preferred data center continues providing the service, and a data center that is not the preferred data center stops providing the service in order to avoid a problem of data inconsistency caused when the two data centers whose backup is interrupted provide the service at the same time.

Figure 5:
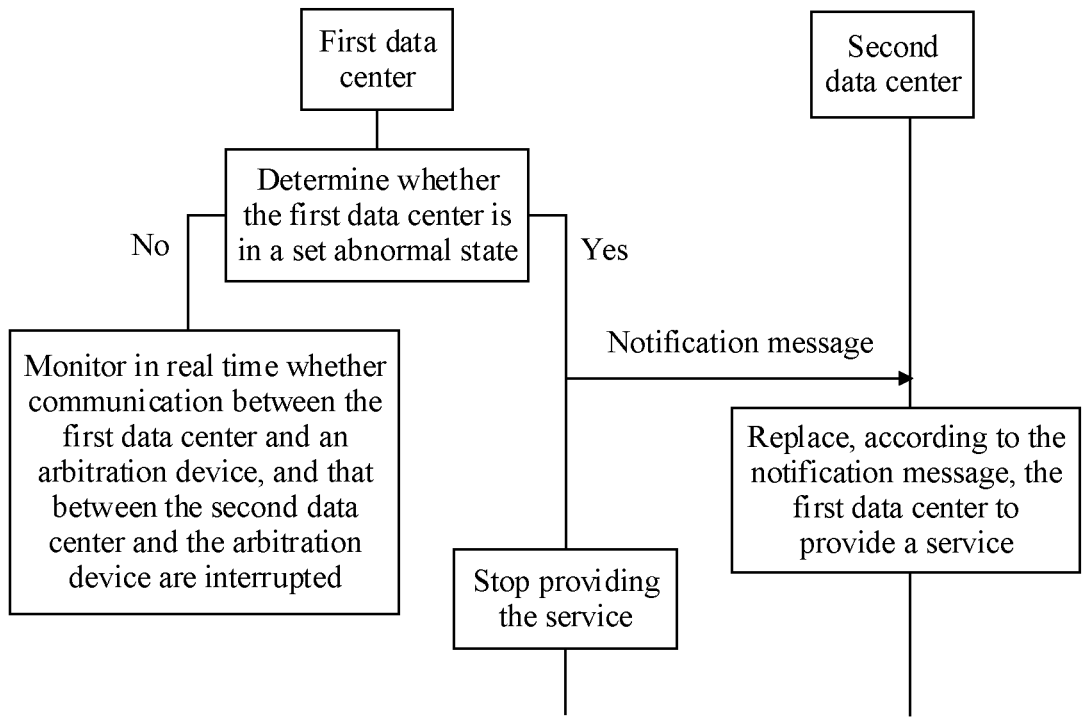
FIG. 5 is a flowchart of a processing process in an abnormal state according to Embodiment 2 of the present disclosure.

In an implementation manner of this embodiment, referring to FIG. 5, the method may further include determining, by the first data center, whether the first data center is in a set abnormal state, when the first data center is not in the set abnormal state, the method further includes monitoring in real time whether communication between the first data center and the arbitration device, and that between the second data center and the arbitration device are interrupted, and when the first data center is in the set abnormal state, and the communication between the first data center and the second data center is not interrupted, sending, by the first data center, a notification message to the second data center, where the notification message instructs the second data center to replace the first data center to provide the service, replacing, by the second data center according to the notification message, the first data center to provide the service, and stopping providing the service by the first data center.

In actual application, the first data center and the second data center may pre-configure an arbitration policy, and the first data center and the second data center can perform self-inspection periodically according to the arbitration policy in order to determine whether the first data center itself or the second data center itself is in the set abnormal state. When a data center determines that the data center itself is in the set abnormal state, the data center sends a notification message to the other data center, when receiving the notification message sent by the data center, the other data center replaces the data center to provide a service.

The first data center may stop providing the service after receiving a message that is sent by the second data center after completion of a work handover for replacing the first data center to provide the service, or may stop providing the service after receiving a message that is sent by the second data center after a start of a work handover for replacing the first data center to provide the service, or may also stop providing the service after the first data center completes data backup, or may also stop providing the service when the first data center cannot provide the service, which is not limited by the present disclosure.

Optionally, the set abnormal state may include at least one of a power outage, a battery fault, write-through running, and a double disk failure. The double disk failure refers to that a quantity of failed disks exceeds a quantity of disks that can be verified, and in this case, data cannot be recovered and used. The write-thorough running refers to that data is written into a disk in real time, and in this case, the data is written at an extremely low rate. The battery fault refers to that there is no backup power supply for writing data in a memory into a disk during a power outage, and in this case, the write-through running is generally used. The power outage refers to that there is no sufficient power to keep backing up data.

It may be understood that, when the first data center is in the set abnormal state, overall running efficiency and performance of the active-active data centers may be affected, and the first data center actively instructs the second data center to replace the first data center to provide the service, which can ensure that the active-active data centers provide an optimal service.

In actual application, execution of the foregoing implementation manner and that of step 201 to step 203 has no time sequence. Because the first data center is in the set abnormal state, running efficiency and performance of the first data center cannot satisfy a user need. Therefore, in a case in which the second data center is not faulty (the communication between the first data center and the second data center is not interrupted), arbitration is not performed by the arbitration device or according to a preferred data center, and the second data center is directly determined as a victorious party, which saves time required by the second data center to replace the first data center to provide the service, thereby improving efficiency. In a case in which the second data center encounters a fault, it is possible that the first data center can further continue providing the service even though the first data center is in the set abnormal state. In order to ensure that the service is uninterrupted, in this case, the arbitration may be performed by the arbitration device or according to a set survived data center, and the first data center is determined as the victorious party.

It should be noted that, when the communication between the first data center and the second data center is restored to be connected after an interrupt, the first data center and the second data center may provide a service at the same time and perform mutual backup again. Further, after determining that the communication between the first data center and the second data center is interrupted, the first data center and the second data center may still send a heartbeat packet to each other (in this case, an interval for sending a heartbeat packet may be the same as that used when the communication between the first data center and the second data center is not interrupted, or may be longer than that used when the communication between the first data center and the second data center is not interrupted), and then, when a heartbeat packet is received for a set quantity of consecutive times, it can be determined that the communication between the first data center and the second data center is restored, which avoids a determining error caused by occasional restoration of the communication between the first data center and the second data center, thereby ensuring accuracy of a conclusion. The first data center and the second data center may also determine, according to a connected signal (for example, an optical signal) reported by a communication device (for example, an optical module) after a connection between the first data center and the second data center is restored, that the communication between the first data center and the second data center is restored.

According to this embodiment of the present disclosure, when a first data center determines that communication between the first data center and a second data center is interrupted, and an arbitration device cannot perform arbitration, the first data center views a preset arbitration policy, and continues providing a service when determining, according to the arbitration policy, that the first data center is a preferred data center, or stops providing the service when determining, according to the arbitration policy, that the first data center is not the preferred data center. In this way, when the first data center determines that the communication between the first data center and the second data center is interrupted, and the arbitration device cannot perform arbitration, only the preferred data center continues providing the service, which resolves a problem of a service interruption caused by a fault of the arbitration device, and ensures that an uninterrupted service is provided for a user.

Embodiment 3

Figure 6:
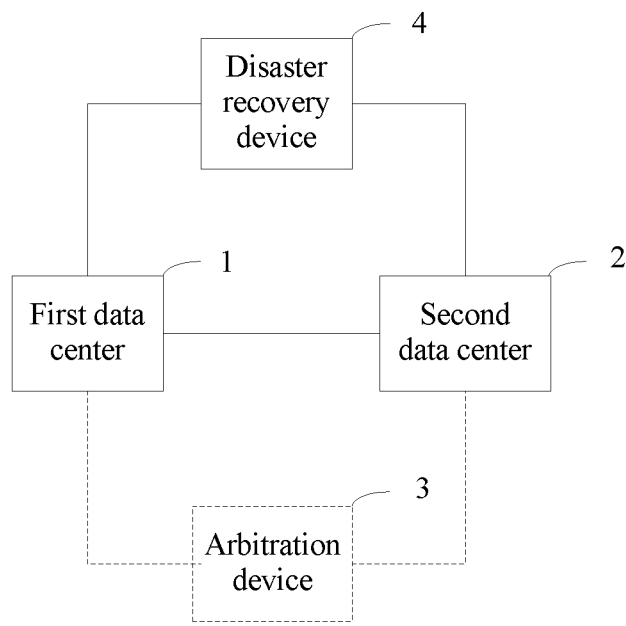
FIG. 6 is a diagram of an application scenario of an arbitration method used in active-active data centers according to Embodiment 3 of the present disclosure.

This embodiment of the present disclosure provides an arbitration method used in active-active data centers, and the following first briefly describes, with reference to FIG. 6, an application scenario of the arbitration method used in the active-active data centers provided in this embodiment.

Compared with the application scenario shown in FIG. 1, a disaster recovery device 4 is further disposed in the application scenario shown in FIG. 6, where the disaster recovery device 4 is configured to back up data of a first data center 1 and that of a second data center 2, and provide a service when the first data center 1 and the second data center 2 are both faulty. As shown in FIG. 6, the disaster recovery device 4 is separately connected to the first data center 1 and the second data center 2.

In actual application, as described in an application scenario part shown in FIG. 1, the first data center 1 and the second data center 2 are generally positioned in a same city. When a natural disaster such as an earthquake happens in the city where the first data center 1 and the second data center 2 are positioned, it is possible that the first data center 1 and the second data center 2 are faulty at the same time. In order to ensure that the disaster recovery device 4 can provide a service at the moment, the disaster recovery device 4, and the first data center 1 and the second data center 2 may be respectively set in two places whose distance exceeds a set distance (for example, 100 km), for example, in different cities (that is, two places with three centers). It is easy to learn that, because the disaster recovery device 4 is relatively far from the first data center 1 and the second data center 2, data backup between the disaster recovery device 4 and the first data center 1 and that between the disaster recovery device 4 and the second data center 2 are asynchronous replication.

Optionally, the disaster recovery device 4 and an arbitration device 3 may be two independent devices. In this case, execution steps of the first data center, the second data center, and the arbitration device are the same as those in Embodiment 2, and details are not described herein.

Optionally, the disaster recovery device 4 and the arbitration device 3 may be a same device, that is, the disaster recovery device 4 implements functions of the arbitration device 3. In specific implementation, independent storage space may be divided from the disaster recovery device 4, and stores arbitration information, for example, a program for performing arbitration, a flag bit indicating whether an arbitration request is received. It may be understood that, compared with specially setting the arbitration device 3, implementing the functions of the arbitration device 3 using the disaster recovery device 4 simplifies an architecture of the active-active data centers, and greatly reduces an implementation cost.

When the disaster recovery device 4 and the arbitration device 3 are a same device, the execution steps of the first data center, the second data center, and the arbitration device in this embodiment are the same as those in Embodiment 2, and a difference lies in a setting of a communication link.

Further, that the first data center sends an arbitration request to the arbitration device may include sending, by the first data center using a data backup link, the arbitration request to the arbitration device, where the data backup link is configured to transmit backup data sent to the arbitration device by the first data center.

It may be understood that, the arbitration request is transmitted directly using the data backup link, which can avoid separately laying a physical link for transmitting the arbitration request, and further reduce the implementation cost.

In an implementation manner of this embodiment, sending, by the first data center using the data backup link, the arbitration request to the arbitration device may include sending, by the first data center, the arbitration request to the arbitration device first when the first data center needs to send both the arbitration request and the data of the first data center to the arbitration device.

In another implementation manner of this embodiment, sending, by the first data center using the data backup link, the arbitration request to the arbitration device may include sending, by the first data center using an arbitration logic link, the arbitration request to the arbitration device, where the data backup link is classified into the arbitration logic link and a data logic link, and the data logic link is configured to transmit the backup data sent to the arbitration device by the first data center.

For example, a bandwidth of the data backup link is 50 megabytes (MB), where 1 MB is assigned to the arbitration logic link, and used for transmitting the arbitration request.

Further, a size of a bandwidth assigned to the arbitration logic link may be set by a user according to an actual situation (for example, a quantity of data centers on which arbitration is performed), and details are not described herein.

It may be understood that, both the foregoing two manners can implement preferential transmission of the arbitration request, and avoid occurrence of a case in which arbitration cannot be performed because an entire data backup link is occupied by backup data.

According to this embodiment of the present disclosure, when a first data center determines that communication between the first data center and a second data center is interrupted, and an arbitration device cannot perform arbitration, the first data center views a preset arbitration policy, and continues providing a service when determining, according to the arbitration policy, that the first data center is a preferred data center, or stops providing the service when determining, according to the arbitration policy, that the first data center is not the preferred data center. In this way, when the first data center determines that the communication between the first data center and the second data center is interrupted, and the arbitration device cannot perform arbitration, only the preferred data center continues providing the service, which resolves a problem of a service interruption caused by a fault of the arbitration device, and ensures that an uninterrupted service is provided for a user.

Embodiment 4

Figure 7:
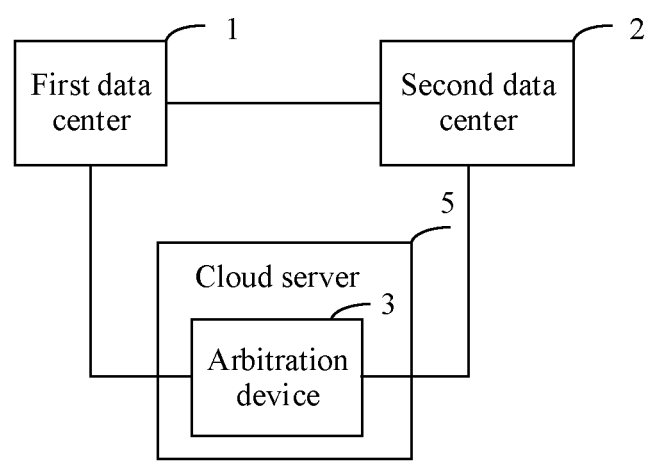
FIG. 7 is a diagram of an application scenario of an arbitration method used in active-active data centers according to Embodiment 4 of the present disclosure.

This embodiment of the present disclosure provides an arbitration method used in active-active data centers, and the following first briefly describes, with reference to FIG. 7, an application scenario of the arbitration method used in the active-active data centers provided in this embodiment.

Compared with the application scenario shown in FIG. 1, in the application scenario shown in FIG. 7, functions of an arbitration device 3 are implemented by a cloud server 5. As shown in FIG. 7, the cloud server 5 is separately connected to a first data center 1 and a second data center 2.

In specific implementation, a virtual machine may first be applied for from the cloud server 5, and then a program for performing arbitration is deployed on the applied virtual machine. Then the cloud server 5 can perform arbitration.

Further, the cloud server 5 may be a free or low-cost public cloud provided by a third-party provider, for example, a public cloud provided by HUAWEI Technologies Co., Ltd., Amazon.com Incorporated, ALIBABA Group Holding Limited Corporation, or MICROSOFT Corporation.

It may be understood that, implementing the arbitration device 3 using the public cloud can greatly reduce an implementation cost of the arbitration device 3.

It is easy to learn that, a core attribute of the public cloud is a shared resource service. In order to ensure security of user data, in addition to steps that are basically the same as steps performed by the first data center, the second data center, and the arbitration device in Embodiment 2, this embodiment further includes some settings used to improve security data stored by a data center.

In an implementation manner of this embodiment, that the first data center sends an arbitration request to the arbitration device may include sending, by the first data center using a virtual private network (VPN), the arbitration request to the arbitration device.

In another implementation manner of this embodiment, that the first data center sends an arbitration request to the arbitration device may include sending, by the first data center, the arbitration request to the arbitration device, where a target port of the arbitration request is a set port number.

In actual application, a firewall may be set between the first data center and the arbitration device, and a port number of the cloud server that communicates with the first data center is set using the firewall. When a source port and a target port of a message transmitted to the firewall include a port number except a port number of the first data center and the set port number, the firewall may directly delete the message, that is, terminate transmission of the message.

In still another implementation manner of this embodiment, that the first data center sends an arbitration request to the arbitration device may include sending, by the first data center, a communication request to the arbitration device, and sending, by the first data center, the arbitration request to the arbitration device after receiving a communication request reply sent by the arbitration device.

In actual application, a firewall may be set between the first data center and the arbitration device, and communication between the cloud server and the first data center is set, using the firewall, to be initiated only by the first data center, that is, only a communication request sent by the first data center can pass through the firewall and be transmitted to the arbitration device. If the cloud server sends a communication request to the first data center, the firewall may directly delete the communication request. Therefore, the communication request cannot be sent to the first data center, and communication cannot be established.

According to this embodiment of the present disclosure, when a first data center determines that communication between the first data center and a second data center is interrupted, and an arbitration device cannot perform arbitration, the first data center views a preset arbitration policy, and continues providing a service when determining, according to the arbitration policy, that the first data center is a preferred data center, or stops providing a service when determining, according to the arbitration policy, that the first data center is not a preferred data center. In this way, when the first data center determines that the communication between the first data center and the second data center is interrupted, and the arbitration device cannot perform arbitration, only the preferred data center continues providing the service, which resolves a problem of a service interruption caused by a fault of the arbitration device, and ensures that an uninterrupted service is provided for a user.

Embodiment 5

Figure 8:
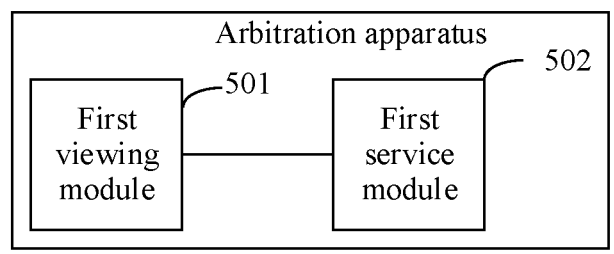
FIG. 8 is a schematic structural diagram of an arbitration apparatus used in active-active data centers according to Embodiment 5 of the present disclosure.

Referring to FIG. 8, this embodiment of the present disclosure provides an arbitration apparatus used in active-active data centers, where the apparatus is disposed on a first data center, and the arbitration apparatus includes a first viewing module 501 configured to view a preset arbitration policy when communication between the first data center and a second data center is interrupted, and an arbitration device cannot perform arbitration, and a first service module 502 configured to continue providing a service when it is determined, according to the arbitration policy, that the first data center is a preferred data center, or stop providing a service when it is determined, according to the arbitration policy, that the first data center is not a preferred data center, where the first data center and the second data center are the active-active data centers.

According to this embodiment of the present disclosure, when a first data center determines that communication between the first data center and a second data center is interrupted, and an arbitration device cannot perform arbitration, the first data center views a preset arbitration policy, and continues providing a service when determining, according to the arbitration policy, that the first data center is a preferred data center, or stops providing a service when determining, according to the arbitration policy, that the first data center is not a preferred data center. In this way, when the first data center determines that the communication between the first data center and the second data center is interrupted, and the arbitration device cannot perform arbitration, only the preferred data center continues providing the service, which resolves a problem of a service interruption caused by a fault of the arbitration device, and ensures that an uninterrupted service is provided for a user.

Embodiment 6

Figure 9:
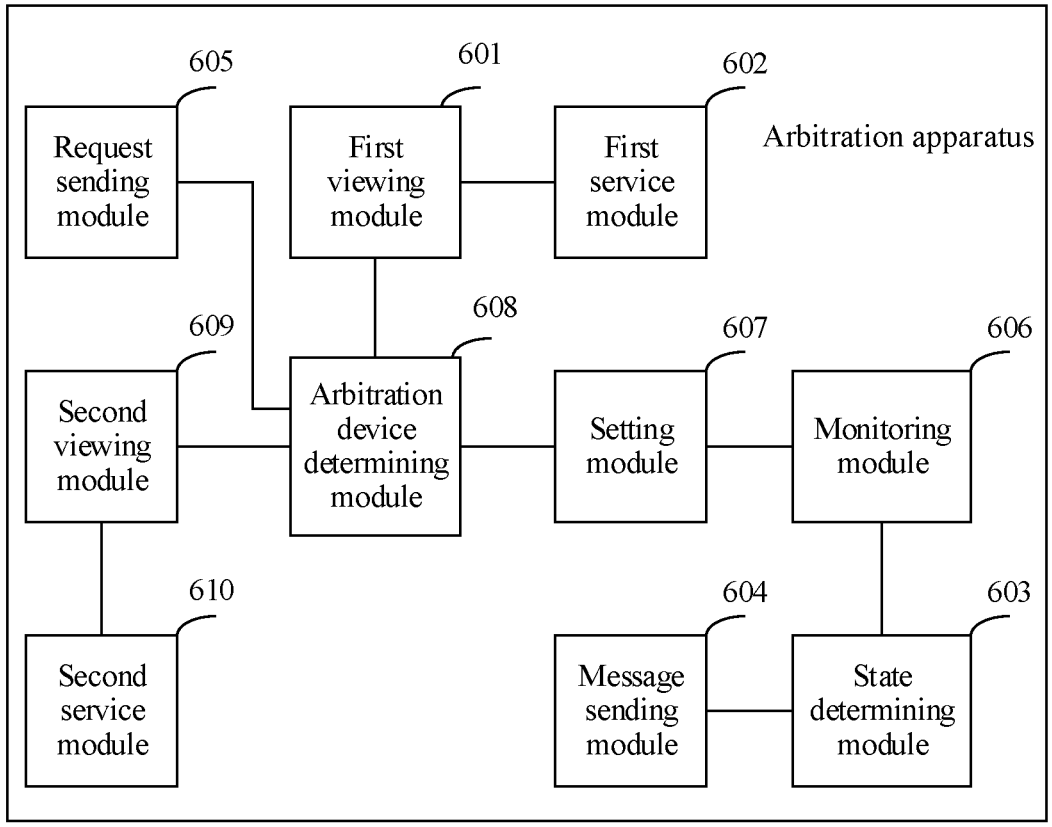
FIG. 9 is a schematic structural diagram of an arbitration apparatus used in active-active data centers according to Embodiment 6 of the present disclosure.

Referring to FIG. 9, this embodiment of the present disclosure provides an arbitration apparatus used in active-active data centers, and this embodiment further describes in detail the arbitration apparatus used in the active-active data centers provided in Embodiment 5. The apparatus is disposed on a first data center, and the arbitration apparatus includes a first viewing module 601 configured to view a preset arbitration policy when communication between the first data center and a second data center is interrupted, and an arbitration device cannot perform arbitration, and a first service module 602 configured to continue providing a service when it is determined, according to the arbitration policy, that the first data center is a preferred data center, or stop providing a service when it is determined, according to the arbitration policy, that the first data center is not a preferred data center, where the first data center and the second data center are the active-active data centers.

In an implementation manner of this embodiment, the arbitration apparatus may further include a state determining module 603 configured to determine whether the first data center is in a set abnormal state, and a message sending module 604 configured to send a notification message to the second data center when the first data center is in the set abnormal state, and the communication between the first data center and the second data center is not interrupted, where the notification message instructs the second data center to replace the first data center to provide the service.

In another implementation manner of this embodiment, the arbitration device may be a disaster recovery device, where the disaster recovery device is configured to back up data of the first data center and that of the second data center.

Optionally, the arbitration apparatus may further include a request sending module 605 configured to send, using a data backup link, an arbitration request to the arbitration device when the communication between the first data center and the second data center is interrupted, and the arbitration device can perform arbitration, where the data backup link is configured to transmit backup data sent to the arbitration device by the first data center.

Preferably, the request sending module 605 may be configured to send the arbitration request to the arbitration device first, or send, using an arbitration logic link, the arbitration request to the arbitration device when the first data center needs to send both the arbitration request and the data of the first data center to the arbitration device, where the data backup link is classified into the arbitration logic link and a data logic link, and the data logic link is configured to transmit the backup data sent to the arbitration device by the first data center.

In still another implementation manner of this embodiment, the arbitration apparatus may further include a monitoring module 606 configured to monitor in real time whether communication between the first data center and the arbitration device, and that between the second data center and the arbitration device are interrupted, a setting module 607 is configured to set an arbitration device flag bit according to a monitoring result, where the arbitration device flag bit indicates whether the arbitration device can perform arbitration, and an arbitration device determining module 608 configured to determine, by the first data center according to the arbitration device flag bit, whether the arbitration device can perform arbitration.

Optionally, the setting module 607 may be configured to set the arbitration device flag bit to that the arbitration device can perform arbitration when the communication between the first data center and the arbitration device is not interrupted, or when the communication between the second data center and the arbitration device is not interrupted, set the arbitration device flag bit to that the arbitration device can perform arbitration when the communication between the first data center and the arbitration device is interrupted, and the communication between the first data center and the second data center is interrupted, and set the arbitration device flag bit to that the arbitration device cannot perform arbitration when the communication between the first data center and the arbitration device is interrupted, and it is determined that the communication between the second data center and the arbitration device is interrupted.

In yet another implementation manner of this embodiment, the arbitration apparatus may further include a second viewing module 609 configured to view the arbitration policy when the communication between the first data center and the second data center is interrupted, and the arbitration device can perform arbitration, and a second service module 610 configured to immediately send an arbitration request to the arbitration device when it is determined, according to the arbitration policy, that the first data center is the preferred data center, and send the arbitration request to the arbitration device after a set time is delayed when it is determined, according to the arbitration policy, that the first data center is not the preferred data center.

In still yet another implementation manner of this embodiment, the arbitration device may be a cloud server.

According to this embodiment of the present disclosure, when a first data center determines that communication between the first data center and a second data center is interrupted, and an arbitration device cannot perform arbitration, the first data center views a preset arbitration policy, and continues providing a service when determining, according to the arbitration policy, that the first data center is a preferred data center, or stops providing a service when determining, according to the arbitration policy, that the first data center is not a preferred data center. In this way, when the first data center determines that the communication between the first data center and the second data center is interrupted, and the arbitration device cannot perform arbitration, only the preferred data center continues providing the service, which resolves a problem of a service interruption caused by a fault of the arbitration device, and ensures that an uninterrupted service is provided for a user.

Embodiment 7

Figure 10:
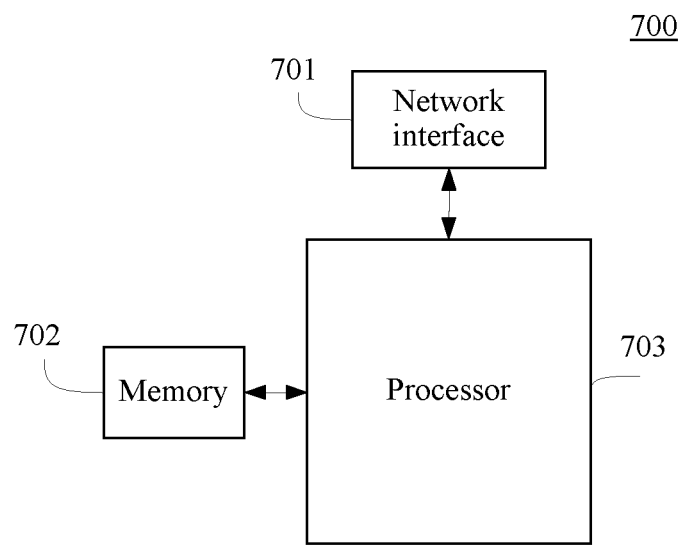
FIG. 10 is a schematic diagram of hardware of an arbitration apparatus used in active-active data centers according to Embodiment 7 of the present disclosure.

This embodiment of the present disclosure provides an arbitration apparatus used in active-active data centers, where the arbitration apparatus may be, for example, a server or a personal computer. Referring to FIG. 10, arbitration apparatus includes a network interface 701, a memory 702, and a processor 703 (for example, a central processing unit (CPU)), which may be used to execute the method in Embodiment 1, Embodiment 2, Embodiment 3, or Embodiment 4.

The following describes each composition part of a system 700 in detail with reference to FIG. 10.

The memory 702 may be configured to store a software program and an application module. By running the software program and the application module that are stored in the memory 702, the processor 703 executes various functional applications of the system 700 and performs data processing. The memory 702 may mainly include a program storage area and a data storage area, where the program storage area may store an operating system, an application program required for at least one function, and the like, and the data storage area may store data (such as an advertisement push policy and push record) created according to processing performed by the system 700, and the like. In addition, the memory 702 may include a high-speed random access memory (RAM), and may further include a non-volatile memory, for example, at least one disk storage component, a flash memory component, or another volatile solid state storage component.

The processor 703 is a control center of the system 700, and connects to each part of the overall system 700 using various types of interfaces and lines.

Further, the processor 703 runs or executes the software program and the application module that are stored in the memory 702, and invokes data stored in the memory 702 such that the processor 703 may view a preset arbitration policy when communication between a first data center and a second data center is interrupted, and the arbitration device cannot perform arbitration, continue providing a service when it is determined, according to the arbitration policy, that the first data center is a preferred data center, or stop providing the service when it is determined, according to the arbitration policy, that the first data center is not the preferred data center, where the first data center and the second data center are the active-active data centers.

In an implementation manner of this embodiment, the processor 703 may determine whether the first data center is in a set abnormal state, and send a notification message to the second data center when the first data center is in the set abnormal state, and the communication between the first data center and the second data center is not interrupted, where the notification message instructs the second data center to replace the first data center to provide the service.

In another implementation manner of this embodiment, the arbitration device may be a disaster recovery device, where the disaster recovery device is configured to back up data of the first data center and that of the second data center.

Optionally, the processor 703 may send an arbitration request to the arbitration device using a data backup link when the communication between the first data center and the second data center is interrupted, and the arbitration device can perform arbitration, where the data backup link is configured to transmit backup data sent to the arbitration device by the first data center.

Preferably, the processor 703 may send the arbitration request to the arbitration device, or send the arbitration request to the arbitration device using an arbitration logic link when the first data center needs to send both the arbitration request and the data of the first data center to the arbitration device, where the data backup link is classified into the arbitration logic link and a data logic link, and the data logic link is configured to transmit the backup data sent to the arbitration device by the first data center.

In still another implementation manner of this embodiment, the processor 703 may monitor in real time whether communication between the first data center and the arbitration device, and that between the second data center and the arbitration device are interrupted, set an arbitration device flag bit according to a monitoring result, where the arbitration device flag bit indicates whether the arbitration device can perform arbitration, and determine, by the first data center according to the arbitration device flag bit, whether the arbitration device can perform arbitration.

Optionally, the processor 703 may set the arbitration device flag bit to that the arbitration device can perform arbitration when the communication between the first data center and the arbitration device is not interrupted, or when the communication between the second data center and the arbitration device is not interrupted, set the arbitration device flag bit to that the arbitration device can perform arbitration when the communication between the first data center and the arbitration device is interrupted, and the communication between the first data center and the second data center is interrupted, and set the arbitration device flag bit to that the arbitration device cannot perform arbitration when the communication between the first data center and the arbitration device is interrupted, and when the communication between the second data center and the arbitration device is interrupted.

In yet another implementation manner of this embodiment, the processor 703 may view the arbitration policy when the communication between the first data center and the second data center is interrupted, and the arbitration device can perform arbitration, immediately send an arbitration request to the arbitration device when it is determined, according to the arbitration policy, that the first data center is the preferred data center, and send the arbitration request to the arbitration device after a set time is delayed when it is determined, according to the arbitration policy, that the first data center is not the preferred data center.

In still yet another implementation manner of this embodiment, the arbitration device may be a cloud server.

According to this embodiment of the present disclosure, when a first data center determines that communication between the first data center and a second data center is interrupted, and an arbitration device cannot perform arbitration, the first data center views a preset arbitration policy, and continues providing a service when determining, according to the arbitration policy, that the first data center is a preferred data center, or stops providing a service when determining, according to the arbitration policy, that the first data center is not a preferred data center. In this way, when the first data center determines that the communication between the first data center and the second data center is interrupted, and the arbitration device cannot perform arbitration, only the preferred data center continues providing the service, which resolves a problem of a service interruption caused by a fault of the arbitration device, and ensures that an uninterrupted service is provided for a user.

Embodiment 8

Figure 11:
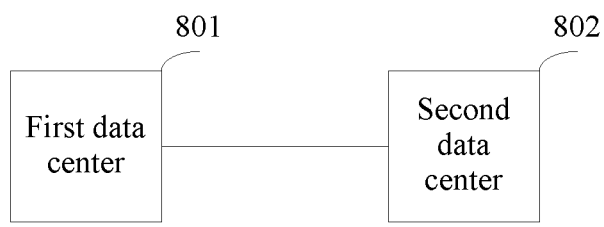
FIG. 11 is a schematic structural diagram of an arbitration system used in active-active data centers according to Embodiment 8 of the present disclosure.

Referring to FIG. 11, this embodiment of the present disclosure provides an arbitration system, where the system includes a first data center 801 configured to view a preset arbitration policy when determining that communication between the first data center 801 and a second data center 802 is interrupted, and an arbitration device cannot perform arbitration, and continue providing a service when determining, according to the arbitration policy, that the first data center 801 is a preferred data center, or stop providing the service when determining, according to the arbitration policy, that the first data center 801 is not the preferred data center, and the second data center 802 configured to view the preset arbitration policy when determining that the communication between the second data center 802 and the first data center 801 is interrupted, and the arbitration device cannot perform arbitration, and continue providing the service when determining, according to the arbitration policy, that the second data center 802 is a preferred data center, or stop providing the service when determining, according to the arbitration policy, that the second data center 802 is not the preferred data center, where the first data center 801 and the second data center 802 are active-active data centers.

According to this embodiment of the present disclosure, when a first data center 801 determines that communication between the first data center 801 and a second data center 802 is interrupted, and an arbitration device cannot perform arbitration, the first data center 801 views a preset arbitration policy, and continues providing a service when determining, according to the arbitration policy, that the first data center 801 is a preferred data center, or stops providing a service when determining, according to the arbitration policy, that the first data center 801 is not a preferred data center. In this way, when the first data center 801 determines that the communication between the first data center 801 and the second data center 802 is interrupted, and the arbitration device cannot perform arbitration, only the preferred data center continues providing the service, which resolves a problem of a service interruption caused by a fault of the arbitration device, and ensures that an uninterrupted service is provided for a user.

It should be noted that, for the arbitration performed by the arbitration apparatus used in the active-active data centers provided in the foregoing embodiment, division of the foregoing functional modules is merely used as an example for description. In actual application, the foregoing functions may be allocated to different functional modules for implementation as required, that is, an internal structure of the apparatus is divided into different functional modules to implement all or a part of the functions described above. In addition, the embodiment of the arbitration apparatus used in the active-active data centers and that of the arbitration method used in the active-active data centers that are provided in the foregoing embodiments pertain to a same concept. For a specific implementation process, refer to the method embodiments, and details are not described herein.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory (ROM), a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An arbitration method comprising:
   determining, by a preferred data center, an arbitration device cannot perform arbitration, wherein the arbitration device is one of a disaster recovery device, a cloud server or a virtual machine in a cloud;
   determining, by a preferred data center, communication between the preferred data center and a non-preferred data center is interrupted; and
   continue providing, by the preferred data center, a service.

2. The arbitration method of claim 1, further comprising backing up, by the disaster recovery device, data of the preferred data center or the non-preferred data center.

3. The arbitration method of claim 1, wherein the preferred data center and the non-preferred data center are active-active data centers.

4. The arbitration method of claim 1, further comprising sending, by the preferred data center, an arbitration request to the arbitration device when communication between the preferred data center and the non-preferred data center is interrupted and the arbitration device can perform arbitration.

5. The arbitration method of claim 1, further comprising:
   monitoring, by the preferred data center in real time, whether communication between the preferred data center and the arbitration device is interrupted;
   monitoring, by the preferred data center in real time, whether communication between the non-preferred data center and the arbitration device is interrupted; and
   setting, by the preferred data center, an arbitration device flag bit according to a monitoring result based on whether communication between the preferred data center and the arbitration device is interrupted and whether communication between the non-preferred data center and the arbitration device is interrupted,
   wherein the arbitration device flag bit indicates whether the arbitration device can perform arbitration.

6. The arbitration method of claim 5, wherein the arbitration device flag bit indicates that the arbitration device cannot perform arbitration when the communication between the preferred data center and the arbitration device is interrupted and the communication between the non-preferred data center and the arbitration device is interrupted.

7. A system comprising a preferred data center and a non-preferred data center, wherein the preferred data center is configured to:
   continue providing a service when communication between the preferred data center and the non-preferred data center is interrupted and when an arbitration device cannot perform arbitration, wherein the arbitration device is one of a disaster recovery device, a cloud server or a virtual machine in a cloud.

8. The system of claim 7, wherein the disaster recovery device is configured to back up data of the preferred data center or the non-preferred data center.

9. The system of claim 7, wherein the preferred data center is further configured to instruct the non-preferred data center to provide the service when the preferred data center is in a set abnormal state and communication between the preferred data center and the non-preferred data center is not interrupted.

10. The system of claim 7, wherein the preferred data center and the non-preferred data center are active-active data centers.

11. The system of claim 7, wherein the preferred data center is configured to send an arbitration request to the arbitration device when communication between the preferred data center and the non-preferred data center is interrupted and the arbitration device can perform arbitration.

12. The system of claim 7, wherein the preferred data center is further configured to:
   monitor in real-time whether communication between the preferred data center and the arbitration device is interrupted;
   monitor in real-time whether communication between the non-preferred data center and the arbitration device is interrupted; and
   set an arbitration device flag bit according to a monitoring result based on whether communication between the preferred data center and the arbitration device is interrupted and whether communication between the non-preferred data center and the arbitration device is interrupted, wherein the arbitration device flag bit indicates whether the arbitration device can perform arbitration.

13. The system of claim 12, wherein the preferred data center is further configured to set the arbitration device flag bit indicating that the arbitration device cannot perform arbitration when communication between the preferred data center and the arbitration device is interrupted and communication between the non-preferred data center and the arbitration device is interrupted.

14. An arbitration method, comprising:
   determining, by a preferred data center, whether communication between the preferred data center and a non-preferred data center is interrupted when an arbitration device cannot perform arbitration, wherein the arbitration device is one of a disaster recovery device, a cloud server or a virtual machine in a cloud; and
   continue providing, by the preferred data center, a service when the communication between the preferred data center and a non-preferred data center is interrupted.

15. The arbitration method of claim 14, further comprising:
   backing up, by the disaster recovery device, data of the preferred data center or the non-preferred data center.

16. The arbitration method of claim 14, further comprising:
   instructing, by the preferred data center, the non-preferred data center to provide the service when the preferred data center is in a set abnormal state and communication between the preferred data center and the non-preferred data center is not interrupted.

17. The arbitration method of claim 14, wherein the preferred data center and the non-preferred data center are active-active data centers.

18. The arbitration method of claim 14, further comprising:
   sending, by the preferred data center, an arbitration request to the arbitration device when communication between the preferred data center and the non-preferred data center is interrupted and the arbitration device can perform arbitration.

19. The arbitration method of claim 14, further comprising:
   monitoring, by the preferred data center in real time, whether communication between the preferred data center and the arbitration device is interrupted;
   monitoring, by the preferred data center in real time, whether communication between the non-preferred data center and the arbitration device is interrupted; and
   setting, by the preferred data center, an arbitration device flag bit according to a monitoring result based on whether communication between the preferred data center and the arbitration device is interrupted and whether communication between the non-preferred data center and the arbitration device is interrupted,
   wherein the arbitration device flag bit indicates whether the arbitration device can perform arbitration.

20. The arbitration method of claim 19, wherein the arbitration device flag bit indicates that the arbitration device cannot perform arbitration when the communication between the preferred data center and the arbitration device is interrupted and the communication between the non-preferred data center and the arbitration device is interrupted.

* * * * *